Dec. 6, 1932. W. H. STAYTON, SR 1,889,763
DISPLAY DEVICE
Filed May 2, 1929   2 Sheets-Sheet 1

Inventor:
William H. Stayton, Sr.
By Wilkinson, Huxley, Byron & Knight
Attys.

Dec. 6, 1932.     W. H. STAYTON, SR     1,889,763
DISPLAY DEVICE
Filed May 2, 1929     2 Sheets-Sheet 2
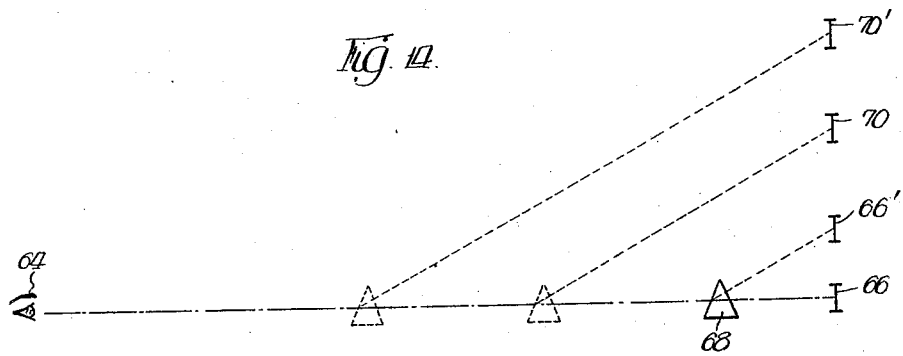
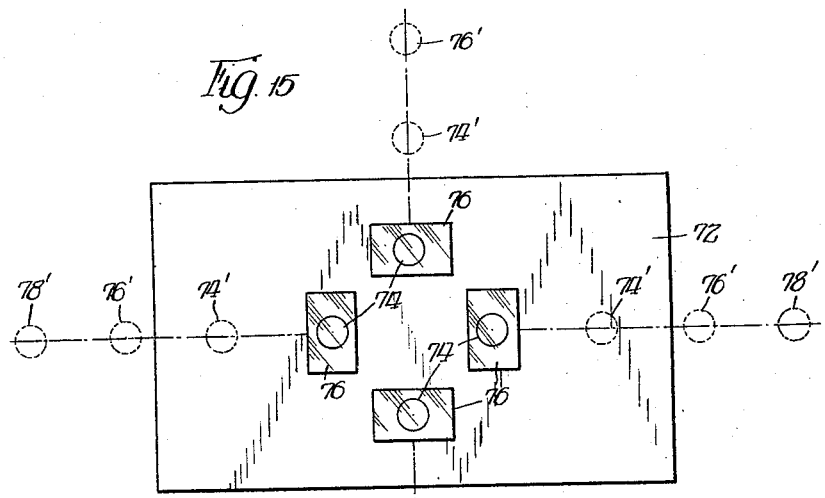
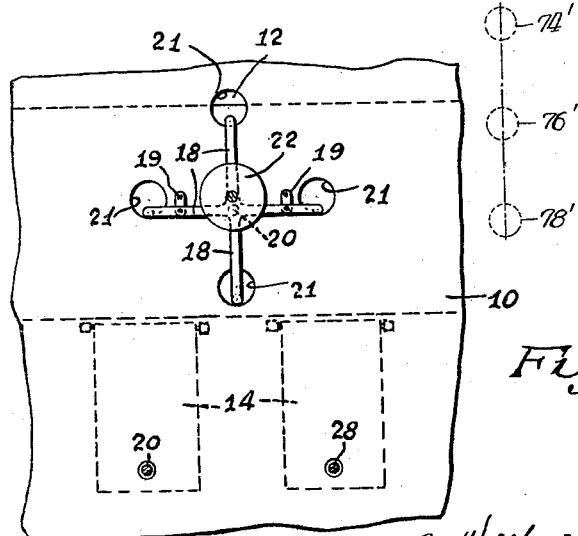
Inventor:
William H. Stayton, Sr.

Patented Dec. 6, 1932

1,889,763

UNITED STATES PATENT OFFICE

WILLIAM H. STAYTON, SR., OF SMYRNA, DELAWARE

DISPLAY DEVICE

Application filed May 2, 1929. Serial No. 359,799.

This invention relates to displays of the character that are employed in advertising and the like and is disclosed herein as embodied in a display provided with means for imparting a semblance of motion to the entire display or to selected parts thereof, as may be desired.

It is a matter of common knowledge that many advertising displays include in their general organizations pictorial representations of movable bodies, such, for example, as the well-known camel in cigarette advertisements, and heretofore when it has been desirable to depict the body in motion, it has been customary to provide several outlines of the legs of the animal in different positions and to illuminate the outlines in succession to simulate walking. The matter of installing, maintaining and operating a sign of this character is one of considerable expense owing in part to the mechanism required in transmitting current to the different lines in the display, and furthermore, such displays are of little or no value in the daytime owing to the fact that the various outlines of the legs are not clearly seen, and the illumination of one outline blots out the others.

In view of the foregoing desideratum it is an important object of the present invention to provide a display of the character described so constructed and arranged that the appearance of movement may be imparted to the indicia of the display without any actual movement being imparted thereto and without the aid of electric lights or the like. In another aspect, an important object of the invention consists in combining with an indicia bearing display separate and independent means for imparting a semblance of motion to the indicia carried by the display. Thus, the invention contemplates the employment of independent means in connection with an ordinary sign-board, or the like, to impart apparent motion to an ordinary display mounted on the sign-board.

An important feature of the invention which is conducive to the accomplishment of the recited object consists in providing a display device with prisms, or with suitable distortion members, at points where it is desired to give the semblance of motion, and to move the prisms or other members in such a manner that the indicia beneath them will appear to move in the desired fashion. For example, in the camel display mentioned above, it will be possible by means of my invention to place ordinary prisms in front of the legs of the animal, and, as movement is imparted to the prisms the visible effect will be that of the legs moving beneath the prisms. Similarly, a prism or transparent distorter may be superimposed over the body of the animal and moved in such a manner as to give to the latter a resemblance of shuffling motion.

In a somewhat different aspect, an important feature of the invention resides in the use of prisms in connection with displays that ordinarily have no movement; the purpose of applying the invention in this connection being to impart a fanciful appearance to such a display in order to attract the eye of a person.

It is to be observed at this point that, although the foregoing statement of invention is apparently somewhat limited in its application to advertising displays and the like, the invention distinctly contemplates a much broader application. Thus the invention may be incorporated in the exhibition of goods, wares and merchandise, in educational displays, amusement displays, such as toys, games, and the like, and it is to be understood that the invention resides not in the particular device or devices in connection with which it is employed but rather does it reside in combining prisms and/or distorters with displays to impart to the immovable parts or indicia of the latter a semblance of motion, or an apparent change of shape or appearance.

Other features of the invention consist in the association with the prisms and distorters, of means for protecting them during outdoor exposure, and of means for cleaning the members from time to time to prevent the impairment of the transparency of such members.

Still further objects and features of the invention will become apparent from a reading of the following specification in the light of the accompanying drawings in which are shown several applications of the invention. Turning now to the drawings:

Figures 14 and 15 illustrate a still further modified application of the invention; and Figure 16 shows the manner of connecting the prism members of Figure 1 with the operating mechanism shown in Figure 2.

Figure 1:
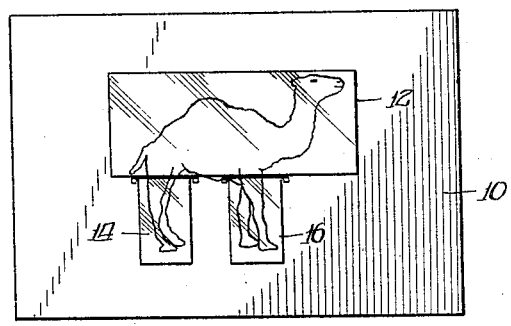
Figure 1 shows in front elevation a sign-board equipped in accordance with the present invention.
Figure 2:
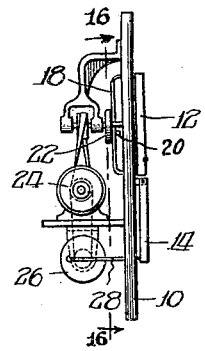
Figure 2 is a view in side elevation of the board shown in Figure 1.
Figure 3:
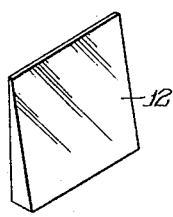
Figures 3 and 4 are views in perspective of a prism and a distorter, respectively, which may be conveniently employed in carrying out the invention.

As shown in the drawings, the reference numeral 10 indicates a vertical sign-board upon the front of which appears a picture of a camel. Superimposed over the body of the camel is a prism or distorter 12 of the same general design as that illustrated in Figure 3 or Figure 4, and superimposed above the legs of the camel are a plurality of additional prisms 14 and 16 pivoted at their top extremities to the front of the board. As shown in Figure 2 the upper prism or distorter 12 is mounted upon bracket arms 18 that extend through openings 21 formed in the sign-board and are carried by a stud 20 eccentrically mounted on a rotary member 22. The bracket arms 18 are additionally supported upon the back of the sign board by pivoted links 19, as shown in Figure 16, which serve to guide the movement of the supporting bracket arms and the distorter 12 and maintain the lower edge of the distorter parallel to the bottom of the sign. A motor 24 imparts movement to the rotary member 22, which causes the upper prism or distorter 12 to be moved in such a manner that points on it move in circles. Furthermore, the motor 24, by means of an eccentric 26, reciprocates a plurality of rods 28 that are connected with the prisms 14 and 16 and cause the lower portions of the latter to move toward and away from the board about their horizontal axes of pivot.

Now, it is a matter of common knowledge that when an image is viewed through a prism it appears to be located at a point removed from its true position in the direction of the thin edge of the prism. Furthermore, movement imparted to the prism results in the semblance of motion being imparted to the image. Thus, such principles result in a seemingly natural gait being imparted to the camel owing to the location and movement of the prismatic members.

Figure 5:
Figure 5 is a view in front elevation of a sign-board showing a somewhat different application of the invention.

The foregoing principles have been employed in connection with the display shown in Figure 5 by superimposing upon the end letters of a sign a plurality of separate prisms or distorters and in periodically moving the latter so as to cause the letters to appear to move from the full line to the dotted line positions and back again. The result of such movement is that the end letters appear to spread, separate from one another and move off in opposite directions, and then, when the prisms move back to their first positions, restoration of the letters takes place.

Figure 8:
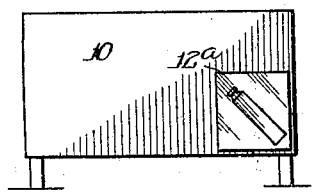
Figures 8 and 9 illustrate the use of the invention in connection with displays having no movable parts.
Figure 9:

Figures 8 and 9 show the application of the invention to displays that have no moving parts. As shown in Figure 8, for example, the sign-board 10, which is located at the side of a road, has a prism 12a superimposed upon the display and as automobiles or other vehicles drive along the road relative movement will take place between the vehicles, the display 10, and the prism 12a, with the result that the desired distortion, or apparent motion, will take place without the provision of moving parts. Similarly, as shown in Figure 9, the prism and display being mounted upon a moving object, a person standing off from the display and viewing it as the latter passes will have presented to him the same semblance of motion that is generally obtained by means of the movable members.

Figure 6:
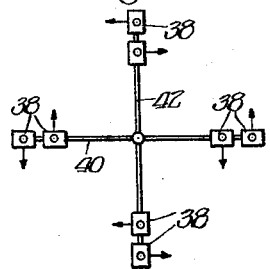
Figures 6 and 7 show the application of the invention to displays of the illuminating variety.
Figure 7:
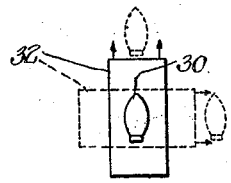

Figures 6 and 7 indicate the application of the invention to illuminated signs. There are signs in use today in which a number of concentric circles of lights are controlled in such a manner as to give the impression of flame traveling in a circle. The installation and maintenance of such a sign and the complex mechanism for operating it are items of great cost and it has been found that through the provision of the present invention the same effect may be secured in a much more convenient and economical way. Thus, as shown in Figure 7, a light 30 may be fixedly mounted and a prism 32 may be disposed in front of the light and there rotated, as indicated by the dotted line position.

With such an arrangement, one viewing the prism 32 during its rotation will see the projected image of the lamp continuously moving in a defined circle and if the prism is moved fast enough or if more than one prism is provided, the appearance will be that of a brilliant flame traveling in a circle. A very interesting modification of the arrangement just described is protrayed in Figure 6, in which a number of prisms 38 are mounted on arms 40, 42 that intersect one another at right angles, in such a manner that, as indicated by the direction arrows, the thin edges of the prisms on each arm point in different directions. Thus, with the images projected upon the prisms movement imparted to the arms gives the appearance of the images moving away from one another in different directions and if the arms are moved at a reasonably high rate of speed, a curious and fanciful appearance results, which may be even further enhanced by making the prism of different colors.

Figure 13:
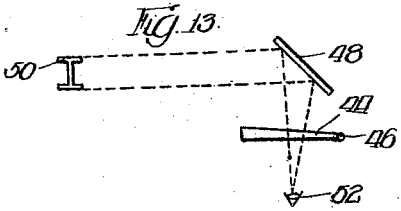
Figure 13 illustrates the use of the invention in connection with indirect displaying.

Turning now to Figure 13, there is illustrated a scheme of carrying out the invention which also is desirable. As there shown a prism 44 is mounted to move about an axis 46 and to impart indirectly, through a mirror 48, movement to an image 50. Thus, if one views the display from the point 52 he will not only see the image indirectly, but will also see the image apparently moving away from a fixed position and then being restored to it. Let it be pointed out however that motion might be imparted to the mirror and the prism held stationary to produce the same result.

Figure 10:
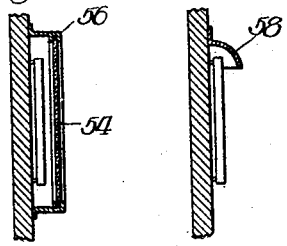
Figures 10 and 11 show the invention provided with means for preventing the accumulation of dust and dirt on the face of the prism or distorter.
Figure 11:
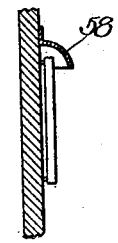
Figure 12:
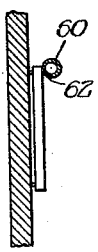
Figure 12 shows a prism or distorter equipped with cleaning means.

It is to be appreciated that the present invention will be used out of doors a great deal and it is accordingly contemplated providing the display with means for protecting it during adverse weather conditions. As shown in Figure 10, a sheet of glass 54 is mounted in front of the display within a tightly fitting frame 56, and, as shown in Figure 11, a shield or shade 58 is located above the display to protect it. To the end of cleaning the display when once it becomes soiled by an accumulation of dust or dirt, on the face of the prism or distorter there is provided a hollow tube 60 having perforations 62 in its lower surface through which water may flow downwardly across the face of the display.

Turning now to an examination of Figures 14 and 15, there is picturized in the first of these figures a person's eye 64, an image 66, and a prism 68, all in line with one another. Now owing to the peculiarities of the prism, the image 66, which is actually located in direct line with the prism and the eye, will apparently be located to the observer at the point indicated by the reference numeral 66'. Then, if the prism is moved in the direction of the eye of the observer the image continues to move in a direction at right angles to that line and assumes successively the positions indicated by the reference numerals 70 and 70'. This feature may be applied to a sign in the manner indicated in Figure 15 wherein the reference numeral 72 indicates a signboard, or the like, having a plurality of lamps 74 mounted thereon and a plurality of prisms 76 positioned in front of the lamps with their thin edges pointed outwardly away from the center of the board. With such an arrangement, a person standing in front of the board and viewing the lamps will see them as apparently located at the points indicated by the reference numerals 74', and then, if the prisms are moved outwardly toward the observer in a direction at right angles to the face of the board, the images of the lights 74 will move outwardly to assume successively the positions indicated by the reference numerals 76' and 78'. Thus, by means of such an arrangement, a flashing sign may be produced in which radial streaks of illumination are obtained by means of reciprocating the prisms 76 toward and away from the face of the sign-board 72.

Figure 4:
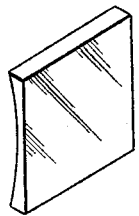

Although the invention has been discussed herein with particular reference to prisms, it is to be understood that the invention contemplates not only the use of prisms, but also distorters, such, for example, as that shown in Figure 4, and likewise any others that are suitable in answering the purposes outlined in the foregoing paragraphs of this discussion. Such a prism might take the form of a transparent shell containing a suitable fluid.

Furthermore, it is to be appreciated that the invention may be embodied in innumerable modifications in addition to those illustrated and described herein, and may be used to other analogous ends, as, for example, by employing the prism, or distorter, to magnify motion as contrasted with producing it, and that such modifications and further adaptions are contemplated by the invention, the real scope of which is set forth in the appended claims.

Having thus described my invention what I claim as new and desire to secure by Letters Patent of the United States is:

1. An indicia bearing display having in combination therewith, a plurality of prisms superimposed upon different parts of the display together with means for imparting motion to the various prisms to cause a semblance of motion to be imparted to the several parts of the indicia.

2. In an assembly of the character described, the combination with a member having display matter thereon, of transparent prisms for refracting rays proceeding from predetermined portions only of said matter, and means for causing regularly recurring relative movements between said member and prisms, such as will give an appearance of animation to the display matter.

3. The method of causing display matter to take on appearance of animation which consists, in refracting the rays from predetermined portions only of the display matter, and imparting to said refracted rays motion relative to the rays from the rest of the display in regularly recurring cycles.

4. In an assembly of the character described, the combination with a display, of a transparent member having smooth, oppositely disposed faces, angularly related with respect to each other, interposed between the display and the point of observation of the display, said member being arranged to receive a projected image of the display, together with means for imparting motion to the transparent member to cause a semblance of motion to be imparted to the display.

5. In an assembly of the character described, the combination with a display, of a transparent member having smooth, oppositely disposed faces, angularly related with respect to each other, interposed between the display and the point of observation of the display, said member being arranged to receive a projected image of the display, together with means for imparting relative motion between the transparent member and the display to cause a semblance of motion to be imparted to the latter.

6. In an assembly of the character described, the combination with a display of a single prismatic member interposed between the display and the point of observation of the display, said member being arranged to receive a projected image of the display, together with means for imparting relative motion between the transparent member and the display to cause a semblance of motion to be imparted to the latter.

7. In an assembly of the character described, the combination of a substantially flat surface having display indicia thereon, transparent means arranged to refract rays proceeding from predetermined portions of said display, and means for causing relative movement between said transparent means and said flat surface, whereby to cause an appearance of animation to be imparted to the display indicia, the direction of such relative movement being substantially normal to the flat surface having display indicia thereon.

8. In an assembly of the character described, the combination with a display of a single transparent prismatic member interposed between the display and the point of observation thereof, said member being arranged to receive a projected image of the display, together with means for moving the transparent member in a direction substantially perpendicular to the display to cause a semblance of motion to be imparted to the latter.

Signed at Chicago, Illinois, this 30th day of April, 1929.

WILLIAM H. STAYTON, Sr.